(12) United States Patent
Lau et al.

(10) Patent No.: US 9,635,699 B2
(45) Date of Patent: Apr. 25, 2017

(54) M2M DEVICE RETRY INSTRUCTION TO NON-PEAK NETWORK TIME

(71) Applicants: Verizon Patent and Licensing Inc., Basking Ridge, NJ (US); Cellco Partnership, Basking Ridge, NJ (US)

(72) Inventors: Priscilla Lau, Fremont, CA (US); Patricia R. Chang, San Ramon, CA (US); John F. Macias, Antelope, CA (US); Yee Sin Chan, San Jose, CA (US); Arda Aksu, Martinez, CA (US); Donna L. Polehn, Kirkland, WA (US)

(73) Assignees: Verizon Patent and Licensing Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 311 days.

(21) Appl. No.: 14/087,283

(22) Filed: Nov. 22, 2013

(65) Prior Publication Data

US 2015/0146522 A1    May 28, 2015

(51) Int. Cl.
*H04W 76/02* (2009.01)
*H04W 28/02* (2009.01)
*H04L 12/911* (2013.01)
*H04W 4/00* (2009.01)
*H04W 48/08* (2009.01)
*H04L 12/823* (2013.01)

(52) U.S. Cl.
CPC ......... *H04W 76/027* (2013.01); *H04L 47/823* (2013.01); *H04W 28/0215* (2013.01); *H04W 28/0268* (2013.01); *H04W 28/0284* (2013.01); *H04L 47/32* (2013.01); *H04W 4/005* (2013.01); *H04W 48/08* (2013.01)

(58) Field of Classification Search
None
See application file for complete search history.

(56) References Cited

U.S. PATENT DOCUMENTS

| | | | | |
|---|---|---|---|---|
| 2011/0199905 A1* | 8/2011 | Pinheiro | ............... | H04W 4/005 370/235 |
| 2012/0163265 A1* | 6/2012 | Kotecha | ............. | H04W 74/006 370/312 |
| 2012/0195268 A1* | 8/2012 | Huang | ................ | H04W 74/085 370/329 |
| 2012/0257571 A1* | 10/2012 | Liao | ...................... | H04W 4/005 370/328 |

(Continued)

*Primary Examiner* — Shaq Taha
*Assistant Examiner* — Manuel Rangel

(57) ABSTRACT

A network device stores back-off definitions for different service categories of machine-type communications (MTC). The network device receives a service connection request originating from a wireless terminal and identifies the service connection request as a MTC request. The network device identifies an available bandwidth capacity for at least one portion of a network associated with the MTC request and determines, when the available bandwidth is below an admission threshold capacity, an admission control level for the MTC request. The admission control level is selected from a group of different admission control levels. The network device calculates a retry interval for the MTC request based on the determined admission control level for the MTC request and the available bandwidth capacity, and sends the retry interval with a response for the MTC request.

20 Claims, 8 Drawing Sheets

(56) References Cited

U.S. PATENT DOCUMENTS

| | | | |
|---|---|---|---|
| 2013/0155864 A1* | 6/2013 | Yoshizawa | H04W 4/08 370/235 |
| 2014/0029530 A1* | 1/2014 | Kim | H04W 48/02 370/329 |
| 2014/0206408 A1* | 7/2014 | Choi | H04W 4/08 455/519 |
| 2015/0296499 A1* | 10/2015 | Huang | H04W 72/048 370/329 |

* cited by examiner

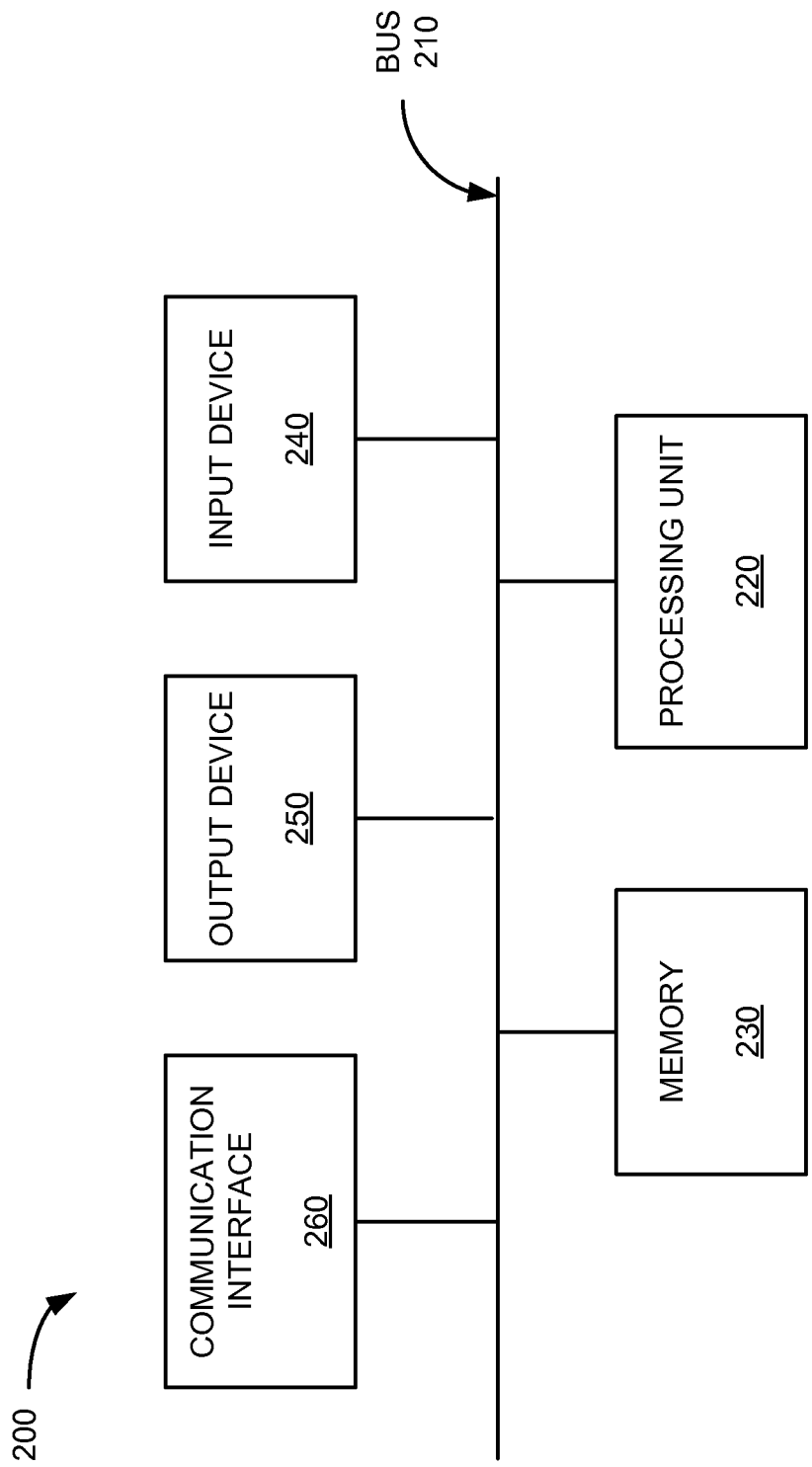

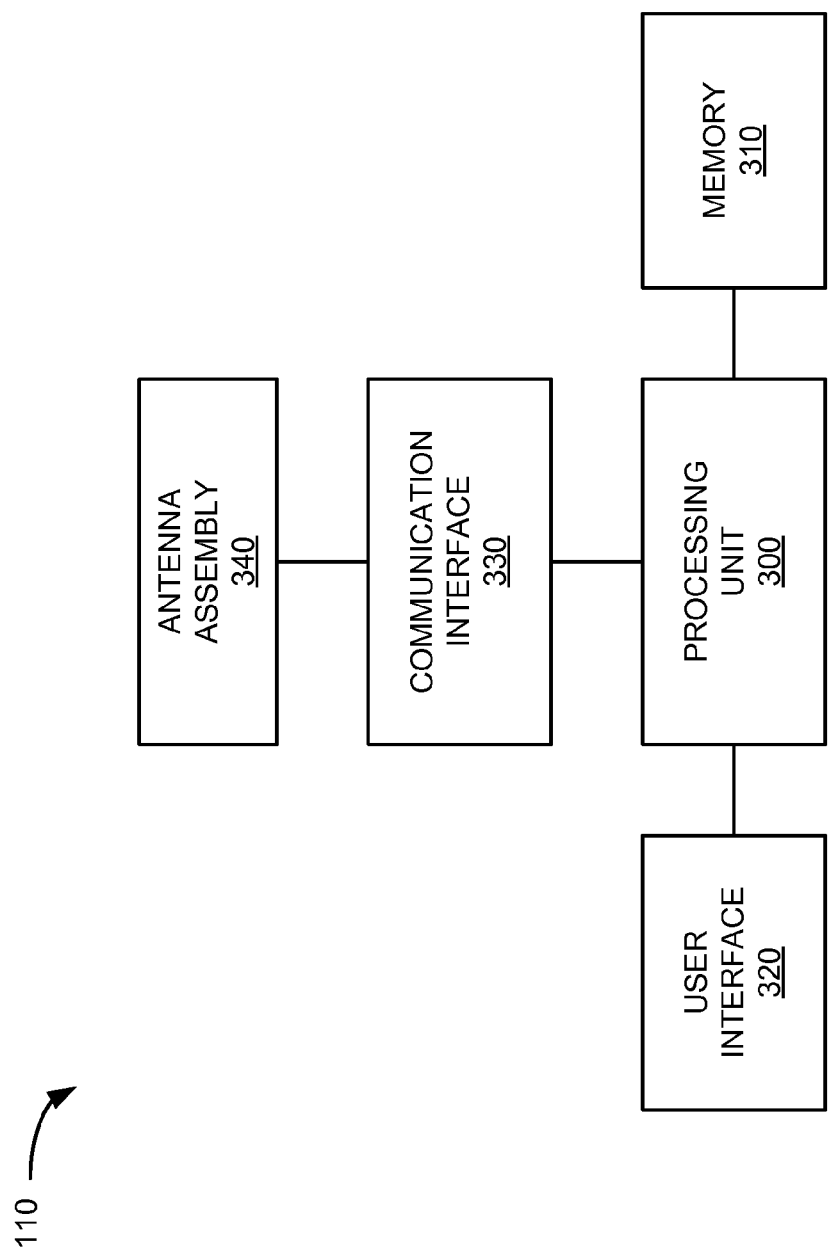

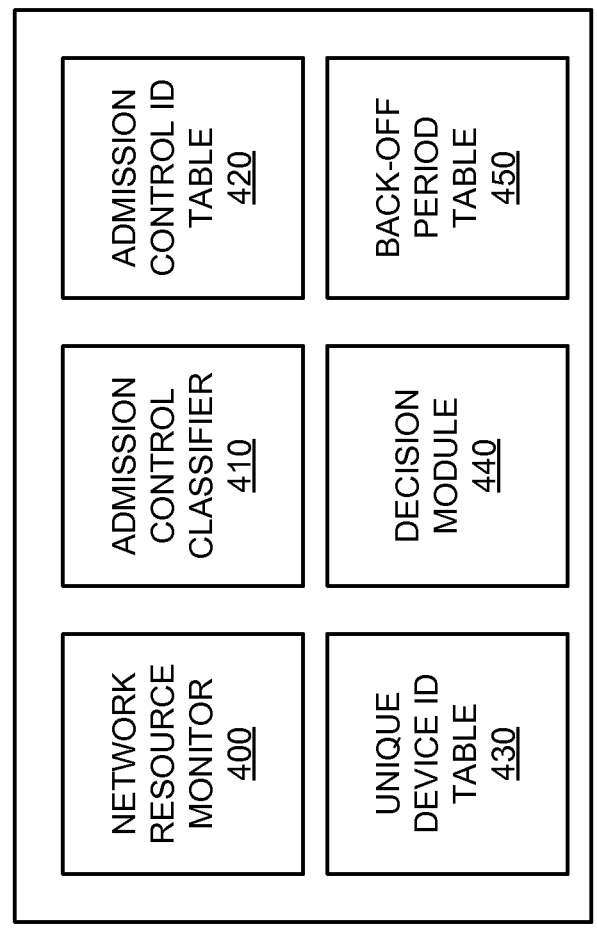

FIG. 5

| Service Category 510 | Service or Application Examples 520 | Delay Sensitivity 530 | Subject to Admission Control? 540 | Admission Control Level 550 |
|---|---|---|---|---|
| 1. | VoLTE, voice call | Extremely High | No | N/A |
| 2. | Internet access, web-browsing. | Extremely High | No | N/A |
| 3. | SMS | High | Yes | 1 |
| 4. | Vehicle Telematics/Fleet Management/alarms | Extremely High | No | N/A |
| 5. | eHealth | High | Yes | 1 |
| 6. | Surevilliance Video | Medium to High | Yes | 2 |
| 7. | Asset Tracking (e.g., vending machine) | Medium to Low | Yes | 3 |
| 8. | Energy Utilities/Metering | Low | Yes | 4 |

420

560 (brace covering rows 1-8)

FIG. 6

| Current Network Load | Admission Control level | Retry After |
|---|---|---|
| 60%-70% | 1 | 2 minutes |
| 60%-70% | 2 | 10 minutes |
| 60%-70% | 3 | 30 minutes |
| 60%-70% | 4 | 60 minutes |
| 70%-80% | 1 | 4 minutes |
| 70%-80% | 2 | 20 minutes |
| 70%-80% | 3 | 60 minutes |
| 70%-80% | 4 | 120 minutes |
| Over 80% | 1 | 8 minutes |
| Over 80% | 2 | 30 minutes |
| Over 80% | 3 | 120 minutes |
| Over 80% | 4 | 240 minutes |

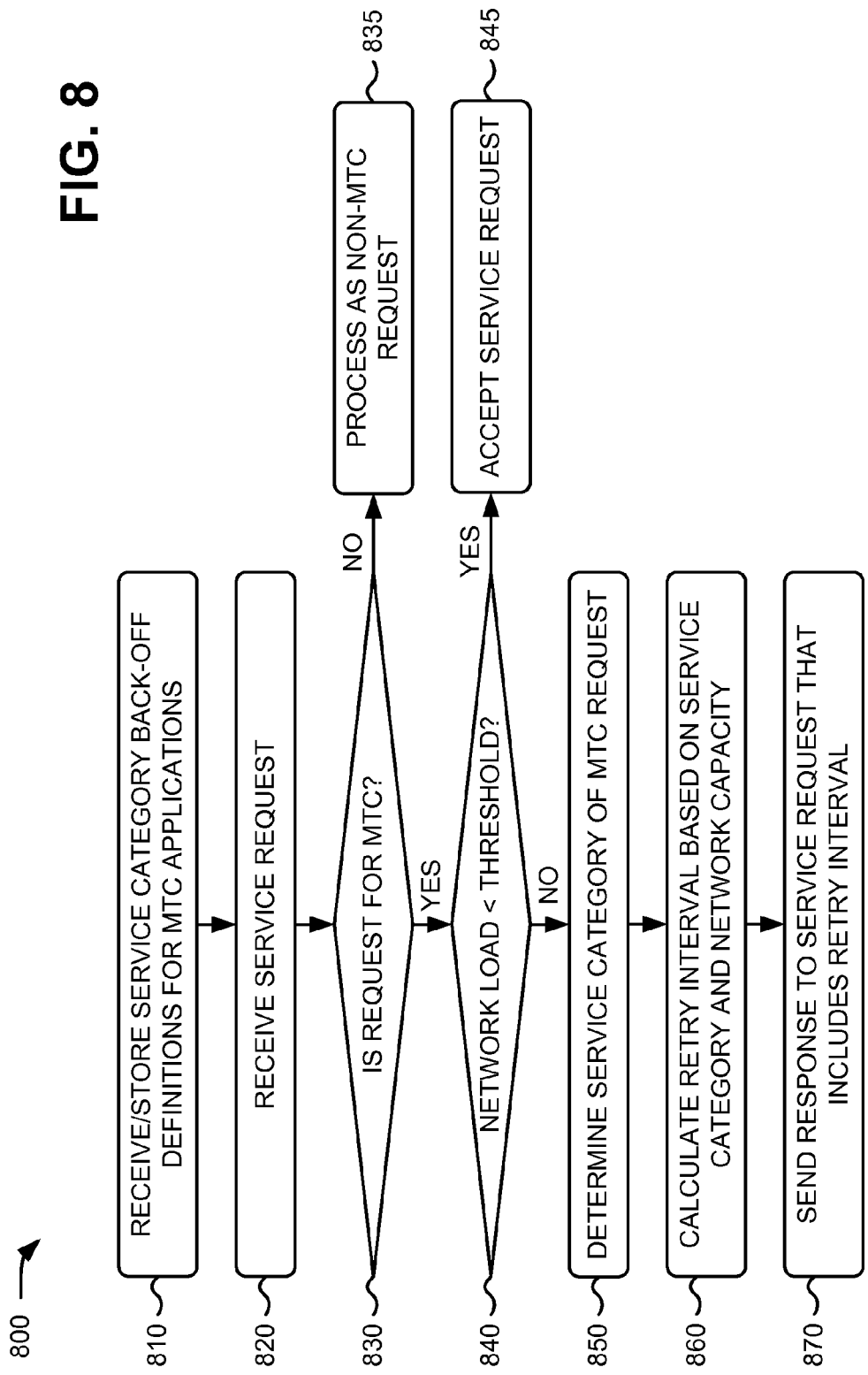

M2M DEVICE RETRY INSTRUCTION TO NON-PEAK NETWORK TIME

BACKGROUND

Machine-to-Machine (M2M) communications, also referred to as Machine-Type Communications (MTC), may refer to technologies that allow devices to communicate with one another over wired or wireless networks without necessarily requiring human interaction. M2M communications can be found in a number of economic sectors, such as security, product tracking, health care, remote monitoring, and diagnostics. An M2M device may include a sensor, a meter, or other device that captures an "event" (e.g., meter reading, temperature, inventory level, etc.), which is relayed through a network (e.g., wireless, wired, or hybrid) to an application that may translate the captured event into meaningful information (e.g., an indication that an item needs to be restocked). Thus, M2M communications may be characterized by periodic, semi-periodic, or on-demand transmission of data. In many instances, these M2M communications are not particularly time-sensitive, but some types of M2M communications may have high delay sensitivity.

M2M applications are commonly deployed using wireless networks, such as Long Term Evolution (LTE) networks, Code Division Multiple Access (CDMA) networks, or Universal Mobile Telecommunications System (UMTS) networks. M2M devices (or "clients") are frequently designed as relatively low-cost devices that can be deployed by an end-user. Accordingly, the communication intelligence in these M2M devices may be relatively limited.

BRIEF DESCRIPTION OF THE DRAWINGS

FIG. 2 is a diagram of exemplary components of a network device of the network depicted in FIG. 1;

FIG. 3 is a diagram of exemplary components of a wireless terminal of the network illustrated in FIG. 1;

FIG. 4 is a diagram of exemplary functional components of the Mobility Management Entity (MME) device of FIG. 1;

FIG. 5 is a simplified example of an annotated admission control identification table of FIG. 4;

FIG. 6 is a simplified example of a back-off period table of FIG. 4;

FIG. 8 is a flow chart of an exemplary process for generating MTC retry instructions according to implementations described herein.

DETAILED DESCRIPTION OF PREFERRED EMBODIMENTS

The following detailed description refers to the accompanying drawings. The same reference numbers in different drawings may identify the same or similar elements.

M2M devices may compete for network resources with other wireless devices. In wireless networks, radio frequency (RF) bottlenecks may occur when too many wireless terminals (which may include M2M devices) attempt to transmit data to a wireless access network at the same time. Delaying machine-type communications (MTC) during these periods of congestion may improve network performance for other delay-sensitive communications. However, MTC applications may have different levels of delay sensitivity. For example, MTC for some electronic health monitoring may have high delay sensitivity, while MTC for utility metering devices may have comparatively low delay-sensitivity. According to implementations described herein, different types of MTC maybe classified in different service categories based on their respective delay sensitivity.

Systems and methods described herein may control retry times for MTC based on these service categories. The systems and methods may define service categories for types of communications from wireless terminals. The service categories may be based on, for example, particular communication functions and may be assigned to particular devices or selectively identified in individual connection requests from the wireless terminals. Each service request from wireless terminals may each be associated with a type of service indicated using, for example, an access point name (APN) included in the service request. When a threshold level of network congestion (e.g., bandwidth use for a wireless access network) is present, the systems and methods may reject a particular communication request (e.g., an MTC request) that is subject to admission controls and provide a retry period based on a service category associated with the request and the network congestion level.

In one implementation, a network device may store back-off definitions for different service categories of machine-type communications. The network device may receive a service connection request originating from a wireless terminal and may identify the service connection request as a MTC request. The network device may identify an available bandwidth capacity for at least one portion of a network associated with the MTC request and may determine, when the available bandwidth is below an admission threshold capacity, an admission control level for the MTC request. The admission control level may be selected from a group of different admission control levels. The network device may calculate a retry interval for the MTC request based on the determined admission control level for the MTC request and the available bandwidth capacity, and may sends the retry interval with a response for the MTC request.

Figure 1:
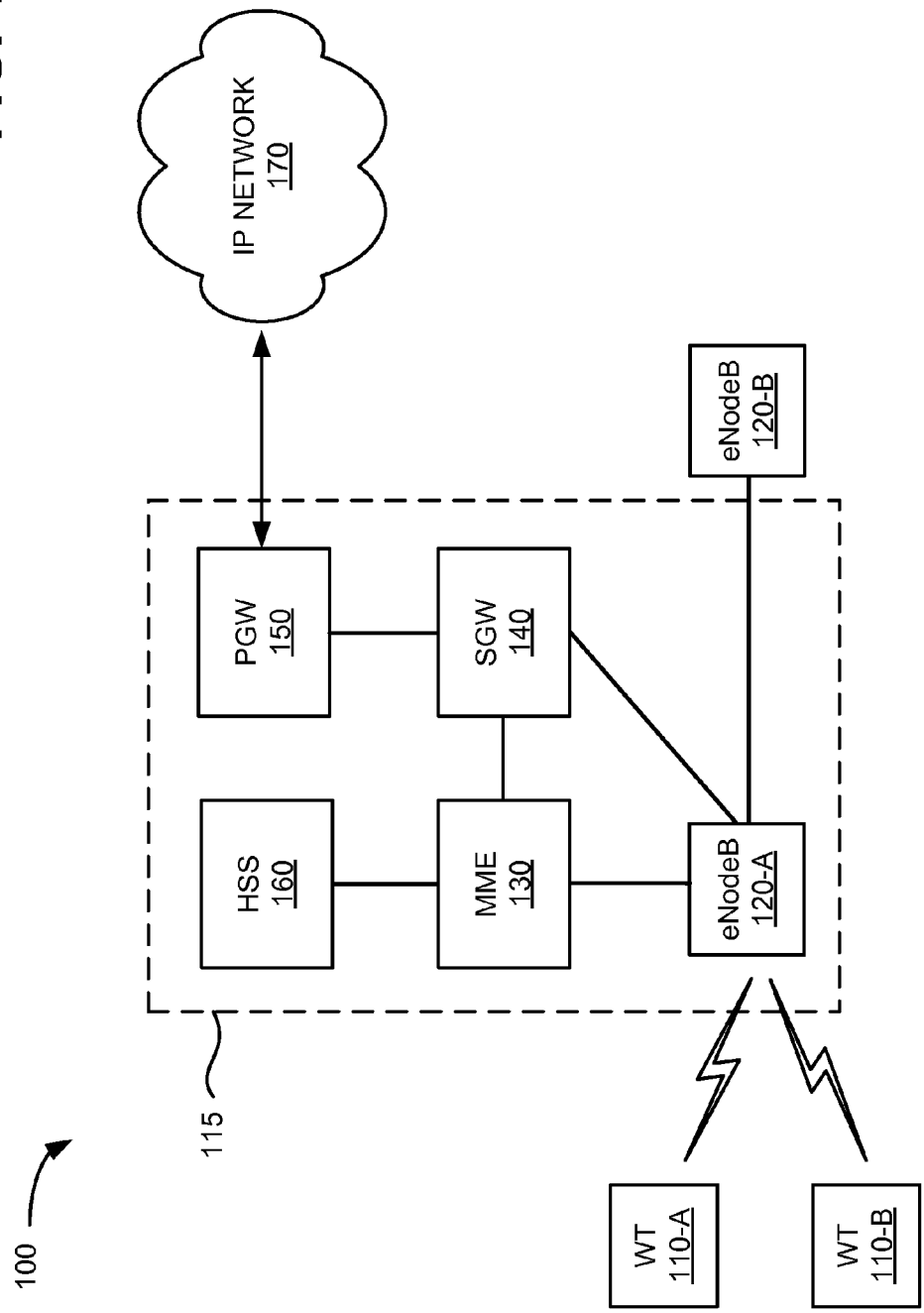
FIG. 1 is a diagram of an exemplary network in which systems and/or methods described herein may be implemented.

FIG. 1 depicts a diagram of an example network 100 in which systems and/or methods described herein may be implemented. As shown, network 100 may include wireless terminals (WT) 110-A and 110-B (referred to collectively as "wireless terminals 110" and, in some instances, individually as "wireless terminal 110"), an access network 115, and an Internet Protocol (IP) network 170. In the example of FIG. 1, access network 115 may correspond to a Long Term Evolution (LTE) access network. Access network 115 may include one or more devices that implement logical entities interconnected via standardized interfaces, and that provide wireless packet-switched services and wireless IP connectivity to user devices for both data and voice services. Access network 115 may include an eNodeB 120, a mobility management entity (MME) device 130, a serving gateway (SGW) device 140, a packet data network gateway (PGW) device 150, and a home subscriber server (HSS) device 160. The number of devices and networks include in FIG. 1 are for illustrative purposes, in other implementations FIG. 1 may include more wireless terminals 110, eNodeBs 220, MME devices 130, SGW devices 140, PGW devices 150, HSS devices 160, and/or external IP networks 170.

Wireless terminal 110 may include any communication device configured to communicate with a base station via wireless signals. In one implementation, wireless terminal 110 may include an electronic device with a microcontroller, such as a microcontroller controlling actuators or sensors. Examples of wireless terminal 110 may include a health monitoring device (e.g., a blood pressure monitoring device, a blood glucose monitoring device, etc.), an asset tracking device (e.g., a system monitoring the geographic location of a fleet of vehicles, etc.), a device controlling one or more functions of a vehicle (e.g., a climate control system, an engine monitoring system, etc.), a device controlling an electronic sign (e.g., an electronic billboard, etc.), a device controlling a manufacturing system (e.g., a robot arm, an assembly line, etc.), a device controlling a security system (e.g., a camera, a motion sensor, a window sensor, etc.), a device controlling a power system (e.g., a smart grid monitoring device, etc.), or a device controlling a financial transaction system (e.g., a point-of-sale terminal, a vending machine, etc.). In other implementations, wireless terminal 110 may include a portable communication device (e.g., a mobile phone, a smart phone, a tablet device, a global positioning system (GPS) device, and/or another type of wireless device); a server device; a laptop, tablet, or another type of personal computer; a media playing device; a gaming system; or another type of device with wireless communication capability. According to implementations described herein, wireless terminals 110 may initiate machine-type communications by submitting service connection requests to access network 115. If a service connection request is rejected by network 115, wireless terminal 110 may be provided with a particular waiting period (or back-off period) before attempting another service connection request.

eNodeB 120 may include one or more computation and/or communication devices that receive voice and/or data from MME 130 and/or SGW 140 and wirelessly transmit that voice and/or data to wireless terminal 110. eNodeB 120 may also include one or more devices that wirelessly receive voice and/or data from wireless terminal 110 and transmit that voice and/or data to one of MME 130 and/or SGW 140 or to other wireless terminals 110. eNodeB 120 may combine the functionalities of a base station and a radio network controller (RNC) provided in 2G or 3G radio access networks.

MME 130 may include one or more computation and/or communication devices that may be responsible for idle mode tracking and paging procedures (e.g., including retransmissions) for wireless terminal 110. MME 130 may be involved in a bearer activation/deactivation process (e.g., for wireless terminal 110) and may choose a SGW (e.g., SGW 140) for wireless terminal 110 at an initial attach and at a time of intra-LTE handover. MME 130 may provide a control plane function for mobility between LTE and access networks.

According to an implementation described herein, MME 130 may store back-off definitions for different MTC service categories. MME 130 may receive a service connection request originating from wireless terminal 110 and may identify the service connection request as a MTC request. MME 130 may identify available bandwidth for at least one portion of a network associated with the MTC request and may determine, when the available bandwidth is below an admission threshold capacity, an admission control level for the MTC request. The admission control level may be selected from a group of different admission control levels. MME 130 may calculate a retry interval for the MTC request based on the determined admission control level for the MTC request and the available bandwidth capacity, and may send the retry interval with a response for the MTC request.

SGW 140 may include one or more data transfer devices (or network devices), such as a gateway, a router, a switch, a firewall, a network interface card (NIC), a hub, a bridge, a proxy server, an optical add-drop multiplexer (OADM), or some other type of device that processes and/or transfers data. In one example implementation, SGW 140 may route and forward user data packets, may act as a mobility anchor for a user plane during inter-eNodeB handovers, and may act as an anchor for mobility between LTE and other 3GPP (3rd Generation Partnership Project) technologies. SGW 140 may include a local resource timer to manage network resources. SGW 140 may manage and store contexts associated with wireless terminal 110 (e.g., parameters of an IP bearer service, network internal routing information, etc.).

PGW 150 may include one or more data transfer devices (or network devices), such as a gateway, a router, a switch, a firewall, a NIC, a hub, a bridge, a proxy server, an OADM, or some other type of device that processes and/or transfers data. In one example implementation, PGW 150 may provide connectivity of wireless terminal 110 to external PDNs (e.g., in IP network 170) by being a traffic exit/entry point for wireless terminal 110. Wireless terminal 110 may simultaneously connect to more than one PGW 150 for accessing multiple PDNs. PGW 150 may perform policy enforcement, packet filtering for each user, charging support, lawful intercept, and packet screening. PGW 150 may also act as an anchor for mobility between 3GPP and non-3GPP technologies.

HSS 160 may include one or more devices that function as a HSS for access network 115 and/or that act as an authentication, authorization and accounting (AAA) server for access network 115. For example, HSS 160 may store information associated with a subscriber, services that the subscriber has requested or been assigned and settings (e.g., quality of service, service priority, authorized service category, admission control level for authorized service category, charging and policy rules, etc.) associated with the services, and/or a current location of the subscriber. Furthermore, HSS 160 may verify a subscriber's identity, authenticate and/or authorize wireless terminal 110 using a device identification number (e.g., by performing IMSI or MAC authentication), authorize a particular service, and/or track consumption of network resources for a particular subscriber. HSS 160 may provide to MME 130 the subscriber information, including the authorized services service categories, and/or admission control level, during the device authentication and authorization process when wireless terminal 100 requests initial network attachment.

IP network 170 may include one or more networks (e.g., a local area network (LAN), a wide area network (WAN), a metropolitan area network (MAN), an IP Multimedia Subsystem (IMS) network, the Internet, private or public wireless or landline network, etc.) capable of communicating with wireless terminal 110. Wireless terminal 110 may communicate to another wireless terminal 110 via IP network 170 as well as an application or a server that resides inside or outside of IP network 170.

Although FIG. 1 shows exemplary devices/networks of network 100, in other implementations, network 100 may include fewer devices/networks, different devices/networks, differently arranged devices/networks, or additional devices/networks than depicted in FIG. 1. For example, Alternatively, or additionally, one or more devices/networks of network 100 may perform one or more other tasks described as being performed by one or more other devices/networks of network 100.

FIG. 2 is a diagram of example components of a device 200 that may correspond to one of the devices of network 100. As illustrated, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. In other implementations, processing unit 220 may be implemented as or include one or more application specific integrated circuits (ASICs), field programmable gate arrays (FPGAs), or the like.

Memory 230 may include a random access memory (RAM) or another type of dynamic storage device that stores information and instructions for execution by processing unit 220, a read only memory (ROM) or another type of static storage device that stores static information and instructions for the processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, one or more biometric mechanisms, and the like. Output device 250 may include a device that outputs information to the operator, such as a display, a speaker, etc.

Communication interface 260 may include any transceiver-like mechanism that enables device 200 to communicate with other devices and/or systems. For example, communication interface 260 may include mechanisms for communicating with other devices, such as other devices of network 100.

As described herein, device 200 may perform certain operations in response to processing unit 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may include fewer components, different components, differently-arranged components, or additional components than depicted in FIG. 2. As an example, in some implementations, input device 240 and/or output device 250 may not be implemented by device 200. In these situations, device 200 may be a "headless" device that does not explicitly include an input or an output device. Alternatively, or additionally, one or more components of device 200 may perform one or more other tasks described as being performed by one or more other components of device 200.

FIG. 3 is a diagram of example components of wireless terminal 110. As shown, wireless terminal 110 may include a processing unit 300, memory 310, a user interface 320, a communication interface 330, and an antenna assembly 340.

Components of wireless terminal 110 may interconnect via wired and/or wireless connections.

Processing unit 300 may include one or more processors, microprocessors, ASICs, FPGAs, or the like. Processing unit 300 may control operation of wireless terminal 110 and its components in a manner described herein. For example, processing unit 300 may generate service connection requests to access network 115 by including appropriate device identifiers (IDs) and APNs. Processing unit 300 may also receive and monitor retry periods when a service connection request is rejected.

Memory 310 may include a RAM, a ROM, and/or another type of memory to store data and instructions that may be used by processing unit 300. In one implementation, memory 310 may include, for example, one or more device identifiers for wireless terminal 110 and one or more APNs to use in service connection requests for MTC applications.

User interface 320 may include mechanisms for inputting information to wireless terminal 110 and/or for outputting information from wireless terminal 110. Examples of input and output mechanisms might include buttons (e.g., control buttons 330, a joystick, etc.) or a touch screen interface to permit data and control commands to be input into wireless terminal 110; a speaker (e.g., speaker 310) to receive electrical signals and output audio signals; a microphone (e.g., microphone 340) to receive audio signals and output electrical signals; a display (e.g., display 320) to output visual information (e.g., text input into wireless terminal 110); and/or a vibrator to cause wireless terminal 110 to vibrate.

Communication interface 330 may include, for example, a transmitter that may convert baseband signals from processing unit 300 to RF signals and/or a receiver that may convert RF signals to baseband signals. Alternatively, communication interface 330 may include a transceiver to perform functions of both a transmitter and a receiver. Communication interface 330 may connect to antenna assembly 340 for transmission and/or reception of the RF signals.

Antenna assembly 340 may include one or more antennas to transmit and/or receive RF signals over the air. Antenna assembly 340 may, for example, receive RF signals from communication interface 330 and transmit them over the air, and receive RF signals over the air and provide them to communication interface 330. In one implementation, for example, communication interface 330 may communicate with a network and/or devices connected to a network.

As described herein, wireless terminal 110 may perform certain operations described herein in response to processing unit 300 executing software instructions of an application contained in a computer-readable medium, such as memory 310. The software instructions may be read into memory 310 from another computer-readable medium or from another device via communication interface 330. The software instructions contained in memory 310 may cause processing unit 300 to perform processes that will be described later. Alternatively, hardwired circuitry may be used in place of or in combination with software instructions to implement processes described herein. Thus, implementations described herein are not limited to any specific combination of hardware circuitry and software.

Although FIG. 3 shows example components of wireless terminal 110, in other implementations, wireless terminal 110 may contain fewer components, different components, differently arranged components, or additional components than depicted in FIG. 3. Alternatively, or additionally, one or more components of wireless terminal 110 may perform one or more other tasks described as being performed by one or more other components of wireless terminal 110.

FIG. 4 is a diagram of exemplary functional components of MME 130. In one implementation, the functions described in connection with FIG. 4 may be performed by one or more components of device 200 (FIG. 2). As illustrated in FIG. 4, MME 130 may include a network resource monitor 400, an admission control classifier 410, an admission control identification table 420, unique device ID lookup table 430, a decision module 440, and a back-off period table 450.

Network resource monitor 400 may track network usage levels for access network 115. In one implementation, network resource monitor 400 may obtain network state information from various network devices included in access network 115 and/or from another network monitoring device (not illustrated). Given the amount of network state information that may be collected, a network administrator may elect to limit the collected network state information to particular portions of network 115. For example, the administrator may wish to obtain network state information relating to particular links between particular network devices that are subject to habitual congestion. Alternatively, network resource monitor 400 may obtain network state information pertaining to the entire access network 115. The network state information may include current bandwidth usage. The network state information may also include other forms of network states (e.g., a power outage, a crashed network device, a link failure, congestion, etc.). Network resource monitor 400 may calculate or identify available network resources based on the network state information. For example, network resource monitor 400 may calculate or identify the current available bandwidth on a particular link.

As an example, network resource monitor 400 may monitor bandwidth capacity at one or more eNodeBs 120. Bandwidth capacity may be designated, for example, with particular congestion thresholds based on a percentage of total bandwidth for a particular eNodeB 120 (e.g., 60% congested, 70% congested, 80+% congested). Network resource monitor 400 may provide a signal, for example, to backoff determination module 420 when bandwidth capacity for eNodeB 120 crosses one of the congestion thresholds.

Admission control classifier 410 may identify an admission control level that may be applied to communications from wireless terminal 110. Admission control classifier 410 may identify a category of service for communications, from wireless terminal 110, based on information a service request (e.g., a radio resource request (RRC)). The category of service may be cross-referenced to an admissions control level. In one implementation, admission control classifier 410 may identify a service category directly in a service request. For example, a wireless terminal 110, such as an M2M device, may be configured to provide a particular service category with all communications or with certain types of communications.

In another implementation, admission control classifier 410 may identify a type of request (e.g., MTC, VoIP, Internet, etc.) via an access point name (APN) included in the service request from wireless terminal 110. For example, a dedicated APN for machine-type communications may be used to differentiate MTC services from other network services. Thus, when wireless terminal 110 is being used to, for example, browse the Internet, wireless terminal 110 may provide an Internet APN; and when wireless terminal 110 is being used for an MTC application, wireless terminal 110 may provide an MTC APN. In one implementation, the MTC APN may trigger admission control classifier 410 to identify a service category for a service request. Admission control classifier 410 may use a data structure, such as an admission control identification table 420, to match a category of service for the service request with an admission control level.

FIG. 5 provides a simplified example of an annotated admission control identification table 420 that may be used by admission control classifier 410. As shown in FIG. 5, table 420 may include a service category field 510, a service or application field 520, a delay sensitivity field 530, an admission control applicability field 540, an admission control level field 550, and a variety of entries 560 for fields 510-550. One or more fields 510-550 of table 420 may be provided for illustration/description and not relied on by admission control classifier 410.

Service category field 510 may include a unique identifier (e.g., 1, 2, 3, etc.) for a service category associated with a type of communication initiated by wireless terminal 110. As shown in FIG. 5, each service category in service category field 510 may relate to a different type of communication, as indicated in service or application field 520. For example, service category "1" may be associated with voice communications (e.g., "VoLTE, voice call"), category "7" may be associated with one type of MTC (e.g, "Asset tracking (e.g., vending machine)"), and category "8" may be associated with a different type of MTC (e.g., "Energy Utilities/Metering").

Delay sensitivity field 530 may include a qualitative indication of how delay to communications from a particular service category may be perceived by a user/subscriber. For example, service category "1" (e.g., voice communications) may have extremely high sensitivity to delay, indicating communication delays for this service category have high user/subscriber impact. By contrast, service category "8" (e.g., "Energy Utilities/Metering") may have low sensitivity to delay, indicating communication delays for this service category may have little impact.

Admission control applicability field 540 may provide an indication of whether communications for a particular service category are subject to admissions control, such as particular back-off instructions for wireless terminals 110. For example, based on information in delay sensitivity field 530, admission control applicability field 540 may indicate that service category "1" (e.g., voice communications) is not subject to admission control. By contrast, service category "7" (e.g., "Asset tracking (e.g., vending machine)") and service category "8" (e.g., "Energy Utilities/Metering") may both be subject to admission controls.

Admission control level field 550 may indicate different priority levels for admission controls. Where applicable, admission control levels may range, for example, from a highest priority (e.g., "1") to a lowest priority (e.g., "4") based on the nature of the communications traffic in a service category. For example, based on information in delay sensitivity field 530, admission control applicability field 540 may indicate that service category "7" (e.g., "Asset tracking (e.g., vending machine)") includes an admission control level of "3" and service category "8" (e.g., "Energy Utilities/Metering") includes an admission control level of "4".

According to other implementations, admission control identification table 420 may include additional fields, fewer fields, or different fields than shown in FIG. 5. For example, while table 420 includes service categories for other (e.g., non-MTC) communications, in other implementations table 420 may be limited to service categories for MTC applications (e.g., service categories "4" through "8"). In this case, table 420 would be used by admission control classifier 410 when a service request from wireless terminal 110 includes the MTC APN. Also, while admission control identification table 420 is depicted as a table, according to other implementations, admission control identification table 420 may take the form of some other type of data structure.

Returning to FIG. 4, in one implementation, unique device ID lookup table 430 may include a table or another type of data structure to cross reference a particular wireless terminal 110 with a type of communication originating from that wireless terminal 110. Unique device ID lookup table 430 may be populated with unique identifiers for devices (e.g., M2M devices) as part of a service initialization process or another device registration process. For example, each device included in device lookup table 430 may be associated with a service category, similar (or identical) to service categories used in admission control identification table 420. The unique identifier may include a unique device identifier (UDID), an International Mobile Subscriber Identity (IMSI), a Mobile Station Identification Number (MSIN), or another identifier that may be used to cross-reference particular types of communication from the corresponding device. In one implementation, unique device ID lookup table 430 may be used to determine a default service category for service requests from any particular wireless terminal 110. In another implementation, unique device ID lookup table 430 may be used to identify a service category for any incoming service requests that do not otherwise indicate a service category.

In some implementations, unique device ID lookup table 430 and/or admission control classifier 410 may be created by using the subscriber information downloaded from the HSS 160, during initial attachment or registration of wireless terminal 110 to network 100, and the contents may be valid only for the duration that wireless terminal 100 is attached to network 100. In another implementation, unique device ID table 430 and/or admission control classifier 410 may be provisioned in advance.

Decision module 440 may apply an admission control level for a particular resource request from a requesting wireless terminal 110 to network congestion data. For example, for a particular connection request, decision module may review the admission control level identified by admission control classifier 410 (e.g., from admission control ID table 410 or device lookup table 430) and the network congestion level identified by network resource monitor 400 to determine if a back-off period should be applied. If network resource monitor 400 indicates no congestion (e.g., network usage below a particular threshold), then decision module 440 may accept the connection request. If network resource monitor 400 indicates congestion is present, decision module 440 may determine a back-off period for the request based on the admission control level for the communication.

In one implementation, decision module 440 may project a non-peak network time that can be used to facilitate a particular connection request. For example, decision module 440 may apply network usage history to predict an upcoming time when network congestion will be below a particular usage threshold that is deemed necessary to permit traffic with a certain admission control level. Decision module 440 may then calculate a back-off period to enforce a retry (e.g., by wireless terminal 110) at the predicted time.

By way of further example, decision module 440 (using, e.g., information from network resource monitor 400) may generate prediction data that indicates bandwidth usage over time (e.g., a bandwidth signature) for a particular link or portion of network 115. Decision module 440 may use various models, such as for example, best fit (e.g., root mean-square error, average percent error, etc.), time series models (e.g., auto-regressive, moving average, auto-regressive moving average, auto-regressive integrated moving average, etc.), and/or other well-known methods. Decision module 440 may consider a variety of variables, such as for example, the day of the week, the time of day, the geographic area in which the service request originated, etc. While the complexities in which decision module 440 predicts network resource usage expand beyond the scope of this description, decision module 440 may be configured to forecast network congestion levels and use this information as a basis for calculating a back-off period for retries (e.g., by wireless terminal 110).

As a particular example, assume that, at 5:00 pm, wireless terminal 110 submits a connection request for communications with an admission control level of "4" (e.g., low delay sensitivity) and that the measured network load at 5:00 PM is 72 percent. Assume further that, the usage threshold to permit traffic with an admission control level of 4 is set at 60 percent. Decision module 440 may determine (based on historical network usage and/or projections) that network load will fall below 60% at 6:30 PM. Decision module 440, thus, may reject the connection request and may calculate a back-off period of 90 minutes.

In another implementation, decision module 440 may apply relatively longer back-off periods to connection requests with lower priorities than to connection requests with higher priorities. For example, decision module 440 may use a table or another data structure to identify a particular back-off period for a given network congestion level and admission control level.

FIG. 6 provides a simplified example of a back-off period table 450 that may be used by decision module 440. As shown in FIG. 6, table 450 may include a current network load field 610, an admission control level field 620, a back-off period (e.g., "retry after") field 630, and a variety of entries 640 for fields 610-630.

Current network load field 610 may include a load level to define current network usage when a connection request is received from an M2M device (e.g., wireless terminal 110). In one implementation, entries in current network load field 610 may include different ranges of congestion levels (e.g., "60-70%," "70-80%," "over 80%," etc.). Admission control level field 620 may include a range of an admission control levels for corresponding network loads. Back-off period field 630 may include a range of time intervals, with each internal corresponding to a particular network load and admission control level. Thus, for a particular connection request decision module 440 may identify a current network load (e.g., as identified by network resource monitor 400) and an admission control level (e.g., as identified by admission control classifier 410). Decision module 440 may identify matching entries in current network load field 610 and admission control level field 620 to identify a particular back-off period from back-off period field 630.

As a particular example, assume wireless terminal 110 submits a connection request for communications with an admission control level of "4" while the current network load is in the 70-80 percent range. Decision module 440 may use table 450 to identify 120 minutes as the necessary back-off period. In the illustrative table 450 of FIG. 6, connection requests with any admission control level may not be subject to any restrictions when network loads are less than 60 percent. In other implementations, different network load thresholds may be used.

According to other implementations, back-off period table 450 may include additional fields, fewer fields, or different fields than shown in FIG. 6. Also, while back-off period table 450 is depicted as a table, according to other implementations, back-off period table 450 may take the form of some other type of data structure. In some implementations, a network provider may choose to not to separate the admission control level and service category. That is, the network provider may choose to implement either the concept of service category or admission control level instead of both as described above, to simplify the implementation. In this case, either service category or admission control, whichever is chosen, may be used to map to the back-off period as shown in FIG. 6.

Returning to FIG. 4, decision module 440 may provide (e.g., to wireless terminal 110 via eNodeB 120) a decision to accept or reject a connection request from wireless terminal 110, based on the currently network load and/or admission control level. If a request is rejected, decision module 440 may provide a back-off interval that is determined in accordance with one of the process described above.

Although FIG. 4 shows example functional components of MME 130, in other implementations, MME 130 may contain fewer functional components, different functional components, or additional functional components than depicted in FIG. 4. Additionally, or alternatively, one or more functional components of MME 130 may perform one or more other tasks described as being performed by one or more other functional components of MME 130.

Figure 7:
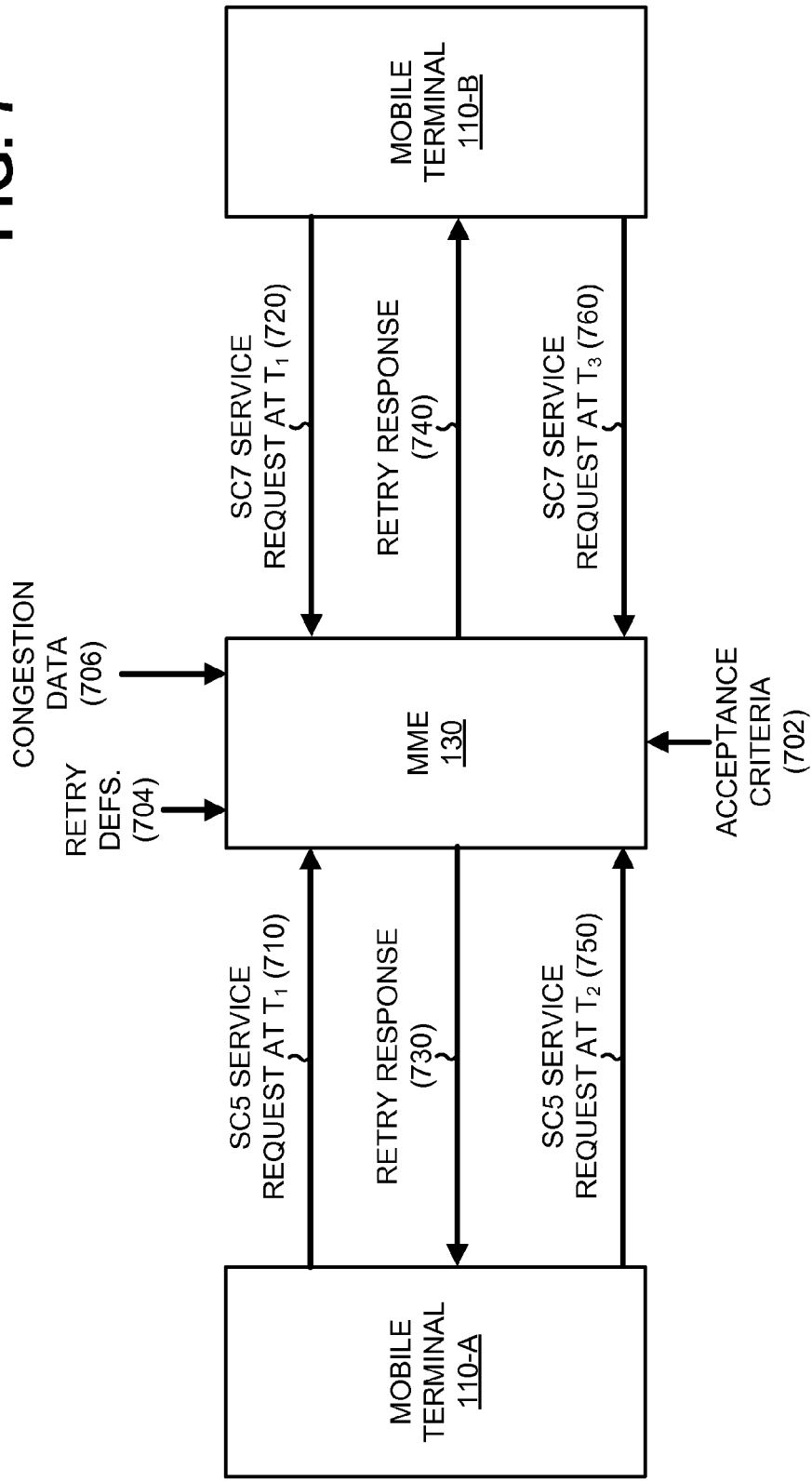
FIG. 7 is a diagram of other exemplary operations capable of being performed by a portion of the network of FIG. 1.

FIG. 7 is a diagram of other exemplary operations capable of being performed by a portion 700 of network 100. As shown, network portion 700 may include wireless terminals 110-A and 110-B and MME 130. Wireless terminals 110 and MME 130 may include the features described above in connection with, for example, one or more of FIGS. 1-6.

As shown in FIG. 7, MME 130 may receive a set of acceptance criteria 702 for handling connection requests from wireless terminals 110. Acceptance criteria 702 may identify one or more thresholds at which admission controls may be applied to certain types of connection requests. In one implementation, acceptance criteria 702 may include an initial threshold that applies to multiple categories (e.g., admission control levels) of connection requests. In another implementation, acceptance criteria 702 may include different initial thresholds for different categories of connection requests. The initial threshold may indicate a lowest network load level at which a connection request may be rejection. For example, an admission control level of "1" may have a higher initial threshold than a request with an admission control level of "4". In other implementations, acceptance criteria 702 may include, for example, network load thresholds, such as network load levels indicated in current network load field 610 (FIG. 6).

MME 130 may also receive retry definitions 704 and congestion data 706. Retry definitions 704 may include, for example, one or more tables or algorithms to instruct MME 130 how to calculate a back-off (e.g., delay) period for retrying a connection request to eNodeB 120/MME 130. In one implementation, retry definitions 704 may include multiple definitions for each type of admission control level, so that the back-off period for each service category may vary based on network conditions. In the example of back-off period table 450 of FIG. 6, three different network load thresholds (e.g., 60%-70%, 70%-80%, and over 80%) may be applied to four different admission control levels (e.g., "1," "2," "3," and "4"). In one implementation, retry definitions 704 may be provided to MME 130 from a network operation center (NOC) or another network management entity associated with access network 115.

Congestion data 706 may include real-time or near-real-time network load information for access network 115. Particularly, congestion data 706 may include available bandwidth indications for each eNodeB 120 that is associated with MME 130.

Still referring to FIG. 7, wireless terminal 110-A may submit a service request 710, at time $T_1$, which may be forwarded to MME 130 via eNodeB 120 (not shown in FIG. 7). In one implementation service request 710 may be a radio resource control (RRC) connection request. Service request 710 may include, for example, an APN (e.g., that indicates MTC) and/or a service category indication (e.g., "SC5") for the type of communication associated with service request 710. Wireless terminal 110-B may submit service request 720, at the same time $T_1$ (for this example), which may also be forwarded to MME 130 via eNodeB 120. Similar to service request 710, service request 720 may include an RCC connection request with an APN for MTC. In contrast with service request 710, service request 720 may include a different service category indication (e.g., "SC7") for the type of communication associated with service request 720. In another implementation, service requests 710 and 720 may not include a service category.

Service requests 710 and 720 may be directed to an eNodeB (e.g., eNodeB 120, not shown), which may forward or generate a corresponding request to MME 130. For simplicity, communications in FIG. 7 are shown as directly between wireless terminals 110-A/110-B and MME 130. Thus, MME 130 may receive service request 710 and service request 720. Based on congestion data 706, MME 130 may determine whether either service request 710 or service request 720 can be immediately accepted. For example, if MME 130 determined that no significant network congestion was present or that service requests 710/720 were not subject to admission controls (e.g., based on an APN type in the respective service requests), then no further determination would be required. In the present example, however, it may be assumed the network congestion level is above an admission threshold (e.g., 64 percent), and that service request 710 and service request 720 are for MTC applications.

Assuming service request 710 and/or service request 720 are subject to admission controls, MME 130 may use admission control ID table 420 to match the service category "5" indicated in service request 710 with admission control level "1." Similarly, MME 130 may use admission control ID table 420 to match the service category "7" indicated in service request 720 with admission control level "3." Assuming congestion data 706 indicates that the relevant portion of access network 115 (e.g., eNodeB 120-A) is operating at 64% capacity, MME 130 may determine that neither of wireless terminal 110-A or 110-B will be permitted to attach to the network. MME 130 may calculate a back-off period for wireless terminal 110-A based on admission control level "1" and a back-off period for wireless terminal 110-B based on admission control level "3." Using back-off period table 450, for example, the back-off period in response to service request 710 may be two minutes and the back-off period in response to service request 720 may be thirty minutes. In other implementations, MME 130 may calculate a back-off period using projections of future network conditions.

MME 130 may provide (via eNodeB 120) retry response 730 including the appropriate calculated back-off period (e.g., two minutes) to wireless terminal 110-A. Similarly, MME 130 may provide retry response 740 including the appropriate calculated back-off period (e.g., thirty minutes) to wireless terminal 110-B.

Wireless terminal 110-A may receive retry response 730. After the back-off period defined in retry response 730 is compete, wireless terminal 110-A may send another Service request 750, at time $T_2$ (e.g., two minutes after time $T_1$). Wireless terminal 110-B may receive retry response 740. After the back-off period defined in retry response 740 is complete, wireless terminal 110-A may send another Service request 760, at time $T_3$ (e.g., thirty minutes after time $T_1$).

Although FIG. 7 shows example components of network portion 700, in other implementations, network portion 700 may contain fewer components, different components, differently arranged components, or additional components than depicted in FIG. 7. For example, in another implementation, some or all the functions attributed to MME 130 may be performed by eNodeB 120. Alternatively, or additionally, one or more components of network portion 700 may perform one or more other tasks described as being performed by one or more other components of network portion 700.

FIG. 8 is a flow chart of an exemplary process 800 for generating MTC retry instructions according to implementations described herein. In one implementation, process 800 may be performed by MME 130. In another implementation, some or all of process 800 may be performed by another device or group of devices, including or excluding MME 130. For example, some parts of process 800 may be performed by eNodeB 120 in conjunction with MME 130.

As shown in FIG. 8, process 800 may include receiving and storing service category back-off definitions for MTC applications (block 810). For example, in implementations described above, retry definitions 704 may be provided to MME 130 in the form of admission control ID table 420, unique device ID table 430, and/or back-off period table 450.

Process 800 may include receiving a service request (block 820), and determining if the service request is for MTC (block 830). For example, in implementations described above, MME 130 may receive a service request (e.g., service request 710) from wireless terminal 110-A via an eNodeB 120. In one implementation, MME 130 (e.g., admission control classifier 410) may identify the service request as a MTC request based on an access point name (APN) included in the service request. In another implementation, admission control classifier 410 may identify a service category, associated with MTC, based on information in the service request and/or information downloaded from the HSS 160.

If the service request is not for MTC (block 830—NO), then process 800 may include processing the service request as a non-MTC request (block 835). For example, MME 130 may apply other processing to determine how to respond to the service request.

If the service request is for MTC (block 830—YES), then process 800 may include determining if the current network load is below an admission threshold (block 840). For example, MME 130 (e.g., decision module 440) may determine if a current network load (as indicated by network resource monitor 400) has a high enough level of congestion to apply admission controls to MTC service requests. For example, using back-off period table 450, decision module 440 may determine whether network load levels are below 60 percent (i.e., the lowest threshold at which admission controls are applied according to the definitions in back-off period table 450).

If the current network load is below the admission threshold (block 840—YES), then process 800 may include accepting the MTC request (block 845). For example, MME 130 may identify network load (or congestion) levels below 60 percent and may accept the service request. That is MME 130 may signal eNodeB 120 to accept the connection with wireless terminal 110.

If the current network load is not below the admission threshold (block 840—NO), then process 800 may include determining an admission control level for the MTC request (block 850). For example, MME 130 (e.g., decision module 440) may identity a unique ID for the wireless terminal 110 from the service request and may use a look-up table (e.g., unique device ID table 430) to identify a service category or admission control level associated with the service request. In another example, MME 130 (e.g., decision module 440) may identify a service category from the service request. With a known service category, decision module 440 may apply admission control ID table 420, to identify an admission control level for the service request.

Process 800 may also include calculating a retry interval based on the admission control level and the network capacity (block 860) and sending a response to the service request that includes the retry interval (block 870). For example, MME 130 (e.g., decision module 440) may calculate a back-off period for wireless terminal 110 based on an admission control level associated with a service category for the service request. MME 130 may use back-off period table 450 to determine a back-off period in response to service request 710. In other implementations, MME 130 may calculate a back-off period using projections of future network conditions. MME 130 may provide (via eNodeB 120) a response (e.g., retry response 730) including the appropriate calculated back-off period to wireless terminal 110.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while series of blocks have been described with respect to FIGS. 9 and 10, the order of the blocks may be modified in other implementations. Further, non-dependent blocks may be performed in parallel.

It will be apparent that different embodiments described above may be implemented in many different forms of software, firmware, and hardware in the implementations illustrated in the figures. The actual software code or specialized control hardware used in the implementations does not limit the invention. Thus, the operation and behavior of these embodiments were described without reference to the specific software code—it being understood that software and control hardware can be designed to implement these embodiments based on the description herein.

Further, certain portions of the invention may be implemented as a "component" or "system" that performs one or more functions. These components/systems may include hardware, such as a processor, an ASIC, or a FPGA, or a combination of hardware and software.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:

1. A method, comprising:
   storing, in a memory of a network device, back-off definitions for different service categories of machine-type communications (MTC), wherein the back-off definitions include at least four different admission control levels for the different service categories, and wherein each of the different admission control levels corresponds to a different delay sensitivity for the different service categories;
   receiving a service connection request originating from a wireless terminal, wherein the service connection request includes an indication of one of the different service categories for the service connection request;
   identifying, by the network device and based on the indication, the service connection request as a MTC request;
   selecting, by the network device and based on the indication, an admission control level, of the at least four different admission control levels in the back-off definitions, for the MTC request;
   identifying, by the network device, a real-time available bandwidth capacity for at least one portion of a network associated with the MTC request;
   associating, by the network device, the real-time available bandwidth capacity with one of multiple congestion levels in the back-off definitions;
   selecting, by the network device and from the back-off definitions, a retry interval for the MTC request, wherein the retry interval corresponds to the selected admission control level for the MTC request and the one of multiple congestion levels; and
   sending, by the network device, the retry interval with a response for the MTC request.

2. The method of claim 1, wherein identifying the service connection request as the MTC request includes:
   identifying, in the service connection request, a dedicated access point name (APN) for the MTC.

3. The method of claim 1, wherein the at least one portion of the network associated with the MTC includes wireless spectrum for a particular eNodeB.

4. The method of claim 1, wherein selecting the admission control level for the MTC request includes matching, in an admission control identification table, the indication in the service connection request to the admission control level.

5. The method of claim 4, wherein the wireless terminal is configured to perform MTC services and non-MTC services, and wherein the indication of one of the different service categories is selected from a group of service categories that includes MTC services and non-MTC services.

6. The method of claim 1, wherein the at least four admission control levels distinguish between services for health monitoring, asset tracking, and energy metering.

7. The method of claim 1, wherein selecting the retry interval for the MTC request includes:
   selecting the retry interval from a look-up table based on the admission control level and the one of multiple congestion levels.

8. The method of claim 1, wherein selecting the retry interval for the MTC request includes:
   predicting a time period when the real-time available bandwidth capacity will be below a required threshold for the selected admission control level, and
   selecting the retry interval for the wireless terminal that corresponds to the time period.

9. The method of claim 1, further comprising determining, after identifying the service connection request as a MTC request, if the MTC request is subject to admission control.

10. The method of claim 1, wherein selecting the retry interval for the MTC request further comprises:
    selecting a first retry interval for the selected admission control level when the real-time available bandwidth capacity is at a first level,
    selecting a second retry interval for the selected admission control level when the real-time available bandwidth capacity is at second level, and
    selecting a third retry interval for the selected admission control level when the real-time available bandwidth capacity is at a third level.

11. A network device, comprising:
    a memory configured to store a plurality of instructions; and
    a processor configured to execute instructions in the memory to:
    store, in the memory, back-off definitions for different service categories of machine-type communications (MTC), wherein the back-off definitions include at least four different admission control levels for the different service categories, and wherein each of the different admission control levels corresponds to a different delay sensitivity for the different service categories;
    receive a service connection request originating from a wireless terminal, wherein the service connection request includes an indication of one of the different service categories for the service connection request;
    identify, based on the indication, the service connection request as a MTC request;
    select, based on the indication, an admission control level, of the at least four different admission control levels in the back-off definitions, for the MTC request;
    identify a real-time available bandwidth capacity for at least one portion of a network associated with the MTC request;
    associate the real-time available bandwidth capacity with one of multiple congestion levels in the back-off definitions;
    select, from the back-off definitions, a retry interval for the MTC request, wherein the retry interval corresponds to the selected admission control level for the MTC request and the one of multiple congestion levels; and
    send the retry interval with a response for the MTC request.

12. The network device of claim 11, wherein, when identifying the service connection request as a MTC request, the processor is further configured to execute instructions in the memory to:
    identify, in the service connection request, a dedicated access point name (APN) for the MTC.

13. The network device of claim 11, wherein the network device comprises a Mobility Management Entity (MME) operating within a Long Term Evolution (LTE)-based network.

14. The network device of claim 11, wherein, selecting the admission control level for the MTC request, the processor is further configured to execute instructions in the memory to:

store registration information for the wireless terminal, and perform a lookup of the admission control level based on a device ID of the wireless terminal.

15. The network device of claim 11, wherein, when selecting the admission control level for the MTC request, the processor is further configured to execute instructions in the memory to:
   match, in an admission control identification table, the indication in the service connection request to the admission control level.

16. The network device of claim 11, wherein, when selecting the retry interval for the MTC request, the processor is further configured to execute instructions in the memory to:
   select the retry interval from a look-up table based on the admission control level and the one of the multiple congestion levels, wherein the look-up table includes multiple admission control levels associated with multiple congestion levels.

17. The network device of claim 11, wherein, when selecting an admission control level for the MTC request, the processor is further configured to execute instructions in the memory to:
   receive, from a home subscriber server (HSS) device, a service category or admission control level during an authentication and authorization process for the wireless terminal at an initial network attachment.

18. A non-transitory computer-readable medium storing instructions executable by a computational device to:
   store back-off definitions for different service categories of machine-type communications (MTC), wherein the back-off definitions include at least four different admission control levels for the different service categories, and wherein each of the different admission control levels corresponds to a different delay sensitivity for the different service categories;
   receive a service connection request originating from a wireless terminal, wherein the service connection request includes an indication of one of the different service categories for the service connection request;
   identify, based on the indication, the service connection request as a MTC request;
   select, based on the indication, an admission control level, of the at least four different admission control levels in the back-off definitions, for the MTC request;
   identify a real-time available bandwidth capacity for at least one portion of a network associated with the MTC request;
   associate the real-time available bandwidth capacity with one of multiple congestion levels in the back-off definitions;
   select, from the back-off definitions, a retry interval for the MTC request, wherein the retry interval corresponds to the selected admission control level for the MTC request and the one of multiple congestion levels; and
   send the retry interval with a response for the MTC request.

19. The non-transitory computer-readable medium of claim 18, wherein the instructions to identify the service connection request as the MTC request include one or more instructions to:
   identify, in the service connection request, a dedicated access point name (APN) for MTC.

20. The non-transitory computer-readable medium of claim 18, wherein the instructions to select the admission control level for the MTC request include one or more instructions to:
   match, in an admission control identification table, the indication in the service connection request to the admission control level.

* * * * *